(12) United States Patent
Maeda

(10) Patent No.: US 7,706,013 B2
(45) Date of Patent: Apr. 27, 2010

(54) IMAGE FORMING SYSTEM

(75) Inventor: Sonoko Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1020 days.

(21) Appl. No.: 11/392,395

(22) Filed: Mar. 29, 2006

(65) Prior Publication Data

US 2007/0182988 A1 Aug. 9, 2007

(30) Foreign Application Priority Data

Mar. 31, 2005 (JP) .............................. 2005-104361

(51) Int. Cl.
G06F 15/00 (2006.01)
G03G 15/00 (2006.01)
(52) U.S. Cl. ..................................... 358/1.16; 399/365
(58) Field of Classification Search ............... 358/1.16, 358/1.15, 1.14, 1.18, 1.13, 529, 1.5, 402, 358/403; 379/201.01; 399/365, 10, 16, 20, 399/81, 83, 282; 707/2, 200, 206; 718/104; 715/210, 764

See application file for complete search history.

(56) References Cited

U.S. PATENT DOCUMENTS 5,511,194 A * 4/1996 Shirakata et al. ............ 718/104
6,600,569 B1 7/2003 Osada et al.
7,062,527 B1 * 6/2006 Tyrrell, III .................. 709/201

FOREIGN PATENT DOCUMENTS

JP A 11-095942 4/1999
JP 2004-001581 A 1/2004

OTHER PUBLICATIONS

The above references were cited in a Jan. 5, 2010 Japanese Office Action a copy of which is enclosed without English Translation, that issued in Japanese Patent Application No. 2005-104361.

* cited by examiner

*Primary Examiner*—Saeid Ebrahimi Dehkordy
(74) *Attorney, Agent, or Firm*—Cowan, Liebowitz & Latman, P.C.

(57) ABSTRACT

In an image forming system which has a client unit, a management unit, and a printer unit, when the client unit issues a replacement print request to the management unit, the management unit notifies the client unit of the contents of the print queue in response to the replacement print request. The client unit displays the notified contents of the print queue, and prompts the user to designate a print job to be replaced and an inserting position of a new print job into the print queue. After that, the client unit outputs, to the management unit, replacement information which includes information indicating the designated print job to be replaced, information indicating the designated inserting position, and the new print job. The management unit updates the print queue in accordance with this replacement information.

22 Claims, 14 Drawing Sheets

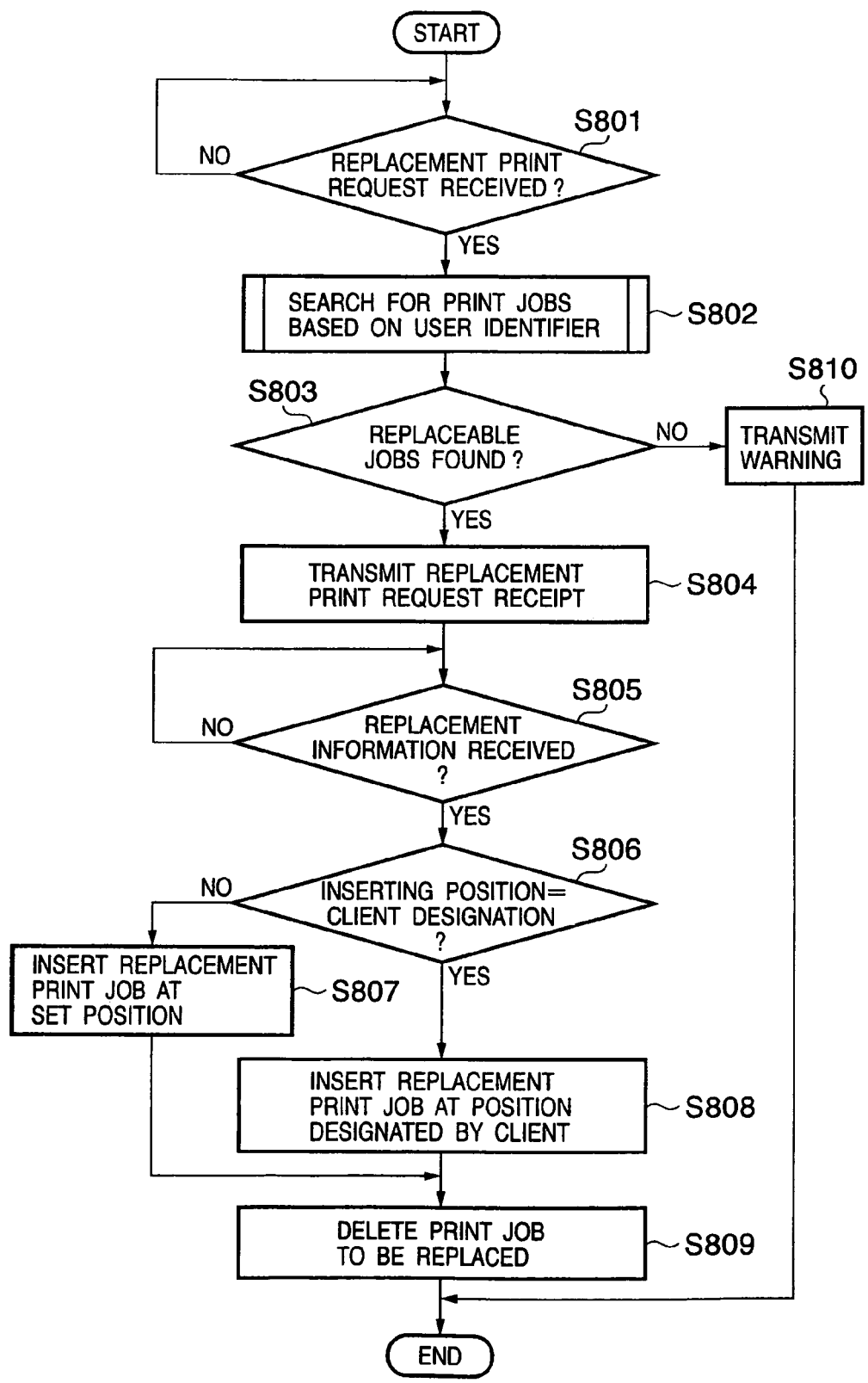

FIG. 10

| | No. | STATUS | JOB NAME | USER NAME | GROUP NAME | NUMBER OF PAGES | NUMBER OF COPIES |
|---|---|---|---|---|---|---|---|
| | 1 | PRINTING | Job aaa | smin | group 1 | 200 | 1000 |
| | 2 | WAITING | Job G21 | bdin | group 1 | 200 | 300 |
| | 3 | WAITING | Job B1 | smin | group 1 | 20 | 2000 |
| ○ | 4 | WAITING | Job C124 | smin | group 2 | 150 | 500 |
| | 5 | WAITING | Job DDD | smin | group 1 | 400 | 300 |
| ○ | 6 | WAITING | Job E333 | tada | group 2 | 30 | 2500 |
| ○ | 7 | IN RIP | Job FFF | miya | group 2 | 100 | 600 |
| | 8 | IN RIP | Job H23 | seirmb | group 3 | 70 | 200 |
| | 9 | HOLD | Job I82 | sirv | group 3 | 300 | 400 |
| | 10 | HOLD | Job J77 | smin | group 3 | 90 | 1000 |

◎ DATA WILL BE INSERTED AT BACKMOST POSITION AFTER REPLACEMENT

NEXT>

OK   CANCEL

FIG. 12

| | No. | STATUS | JOB NAME | USER NAME | GROUP NAME | NUMBER OF PAGES | NUMBER OF COPIES |
|---|---|---|---|---|---|---|---|
| | 1 | PRINTING | Job aaa | smin | group 1 | 200 | 1000 |
| | 2 | WAITING | Job G21 | bdin | group 1 | 200 | 300 |
| | 3 | WAITING | Job B1 | smin | group 1 | 20 | 2000 |
| ○ | 4 | WAITING | Job C124 | smin | group 2 | 150 | 500 |
| | 5 | WAITING | Job DDD | smin | group 1 | 400 | 300 |
| ○ | 6 | WAITING | Job E333 | tada | group 2 | 30 | 2500 |
| ○ | 7 | IN RIP | Job FFF | miya | group 2 | 100 | 600 |
| | 8 | IN RIP | Job H23 | seirmb | group 3 | 70 | 200 |
| | 9 | HOLD | Job I82 | sirv | group 3 | 300 | 400 |
| | 10 | HOLD | Job J77 | smin | group 3 | 90 | 1000 |

◎ INSERT TO NO. [ 2 ▼ ] AFTER REPLACEMENT

[ OK ]  [ CANCEL ]

ORIGINAL POSITION BACKMOST 2
3
4
5
6
7
8
9
10
11
:

IMAGE FORMING SYSTEM

FIELD OF THE INVENTION

The present invention relates to a management technique of a print job in an image forming system.

BACKGROUND OF THE INVENTION

An image forming system in which a client terminal that generates print data and a printer that prints the generated print data are connected directly or indirectly via a server or the like is known. In the image forming system of this type, one of apparatuses which form the system sequentially registers a print job in a print job queue and manages it based on a print job request issued by the client terminal (queuing control). For example, in an arrangement in which the client terminal and printer are one-to-one connected, the client terminal performs queuing control of a print job issued by itself.

Also, an image forming system in which a client terminal, printer, and printer server are connected via a network is well known. In such image forming system, the printer server manages the execution order by the printer of print jobs issued by the client terminal using a print job queue. In general, to such network, a plurality of client terminals and a plurality of printers can be connected. Therefore, the printer server performs queuing control of print jobs issued by the plurality of client terminals, distributes the print jobs to the plurality of printers to be shared, and executes these print jobs in an appropriate order.

Also, an advanced-function printer which can execute print job queuing control processing of the printer server has been proposed. With such advanced-function printer, since the printer itself performs queuing control of print jobs requested from a plurality of client terminals, no printer server is required.

In an image forming system in which a plurality of types of printers are connected to be able to be shared by a plurality of clients, the user who issues a print job output request must recognize the characteristics of these plurality of printers and must select a printer according to the contents to be printed. For this reason, the load on the user who wants to print becomes heavier. To solve such problem, in recent years, a technique for providing a function of automatically selecting an optimal printer in correspondence with the attribute of a print job to the printer server has been proposed.

Even in an image forming system which comprises the printer server having a function of automatically selecting an optimal printer, the user often directly selects a convenient printer for him or her (e.g., a printer closest to the user) so as to print out data. Therefore, even in any of the above image forming systems, the user need designate a desired printer and set detailed information corresponding to the characteristics of the designated printer upon generation of a print job. As a result, the load on the user becomes heavier, and unwanted printing occurs despite of the intention of the user due to setting errors and the like upon setting the detailed information in the printer.

As described above, the user who issued a print job must frequently partially modify information of the print job after the print job is issued and must re-issue the print job. However, in a general image forming system, after a print request is issued (print job is enqueued), the user must request the system administrator to cancel the print job or must cancel the print job by himself or herself, and must issue an output request of the modified print job again. Hence, the operations become complicated, and the traffic on the network increases.

To solve the aforementioned problems, Japanese Patent Laid-Open No. 11-95942 allows to change setting information of a print job even after the print job is enqueued.

However, in the method described in Japanese Patent Laid-Open No. 11-95942, the execution order of replacement print jobs is not mentioned. It is sometimes desirable to place a new print job which is input in a replacement printing mode back to an original position in preference to convenience of the user, but it is sometimes desirable to postpone such job to the backmost position in preference to convenience of other users.

SUMMARY OF THE INVENTION

The present invention has been made in consideration of the aforementioned problems, and has as its object to allow to designate the execution order of a new print job input in a replacement printing mode and to improve operability associated with print jobs.

According to one aspect of the present invention, there is provided a job management method for requesting to replace a print job registered in a print queue by a new print job, comprising: an acquisition step of acquiring contents of the print queue from a management unit that manages the print queue; a first designation step of prompting a user to designate a print job to be replaced by displaying the contents of the print queue acquired in the acquisition step; a second designation step of prompting the user to designate an inserting position of the new print job into the print queue; and an output step of outputting, to the management unit, information indicating the print job to be replaced designated in the first designation step, information indicating the inserting position designated in the second designation step, and the new print job.

Also, according another aspect of the present invention, there is provided a job management method for managing execution of print jobs using a print queue, comprising: a setting step of controlling to set one of a first mode for externally designating an inserting position of a new print job into a print queue and a second mode that follows designation of itself in replacement print processing; a notification step of notifying contents of the print queue and a setting state in the setting step in response to a replacement print request; and a replacement step of deleting a print job to be replaced acquired in response to the notification in the notification step from the print queue, and inserting an acquired new print job into the print queue, wherein the replacement step includes a step of inserting the new print job at a position indicated by inserting position designation information acquired together with the new print job when the first mode is set, and inserting the new print job at a position which is set in advance when the second mode is set.

Furthermore, according another aspect of the present invention, there is provided a job management method in an image forming system which comprises a client unit that issues a print job, a management unit that manages print jobs using a print queue, and a printer unit that executes print processing according to the print jobs, comprising: an issuing step of issuing a replacement print request from the client unit to the management unit; a notification step of notifying the client unit of contents of the print queue from the management unit in response to the replacement print request; a first designation step of prompting a user to designate a print job to be replaced by displaying the contents of the print queue notified in the notification step in the client unit; a second designation step of prompting the user to designate an inserting position of a new print job into the print queue in the client unit; an output step of outputting, to the management unit, replacement information which includes information indicating the print job to be replaced designated in the first designation step, information indicating the inserting position designated in the second designation step, and the new print job; and an update step of updating the print queue in accordance with the replacement information output in the output step.

Furthermore, according another aspect of the present invention, there is provided a job processing method suited to a system which has a printing apparatus that can print data in a storage unit which can store a plurality of job data to be printed, comprising steps of: allowing to execute replacement processing of any of the plurality of job data in the storage unit; and allowing a user to designate an execution order of a job to be replaced via a user interface unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart of replacement print processing in the printer server according to the embodiment of the present invention;

FIG. 10 shows a window display example of the client PC in a replacement printing mode;

FIG. 12 shows a window display example of the client PC in the replacement printing mode;

DETAILED DESCRIPTION OF THE PREFERRED EMBODIMENTS

Preferred embodiments of the present invention will now be described in detail in accordance with the accompanying drawings.

Figure 1:
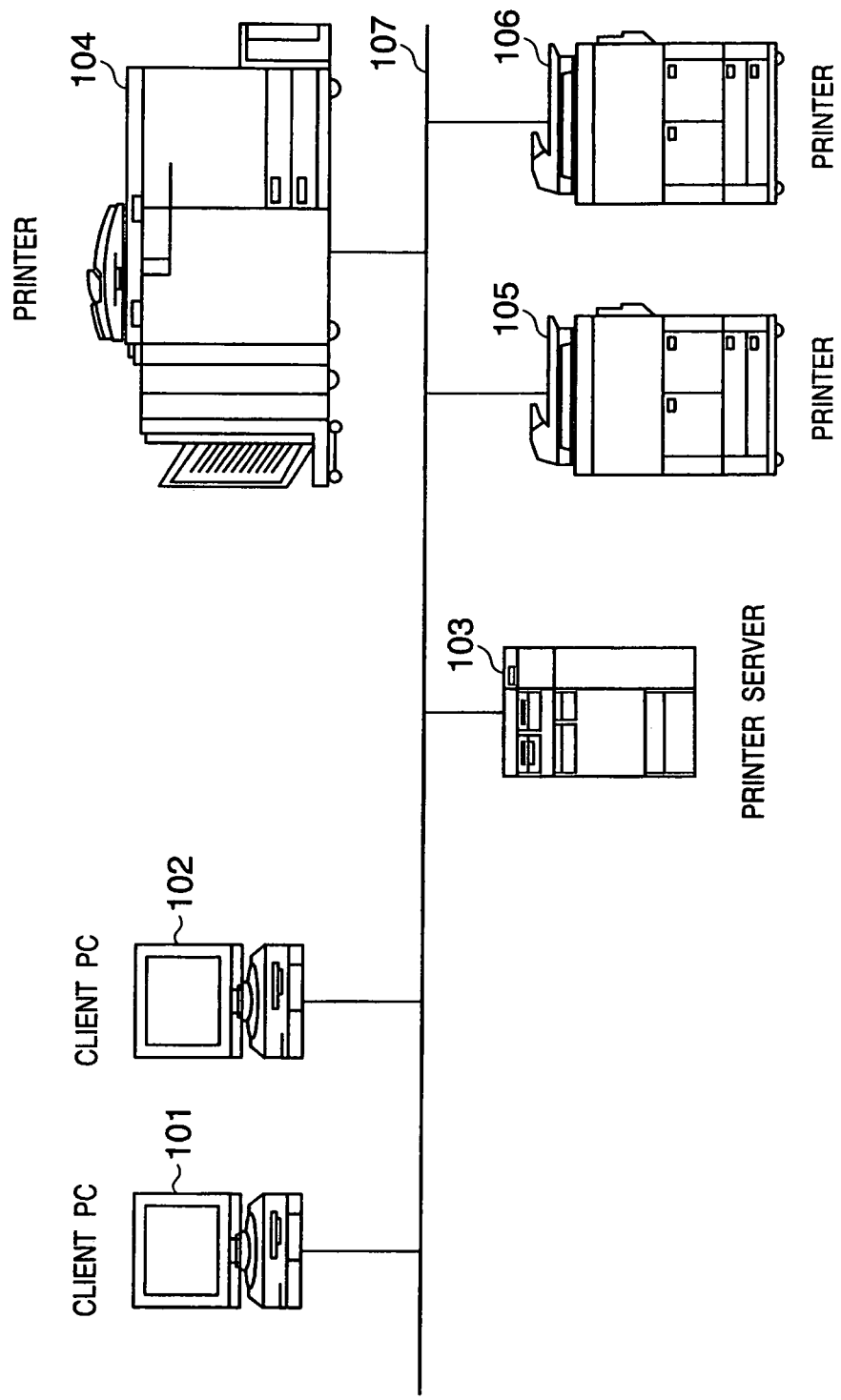
FIG. 1 is a diagram showing an example of the arrangement of an image forming system according to an embodiment of the present invention.

FIG. 1 shows an example of the arrangement of an image forming system according to an embodiment of the present invention. In the image forming system shown in FIG. 1, client terminals 101 and 102 (to be referred to as client PCs hereinafter), a printer server 103 comprising a job manager, and printers 104, 105, and 106 are connected via a network 107. In the following description, the arrangement and operation of the client PC of this embodiment will be explained using the client PC 101 and those of the printer will be explained using the printer 104.

Figure 2:
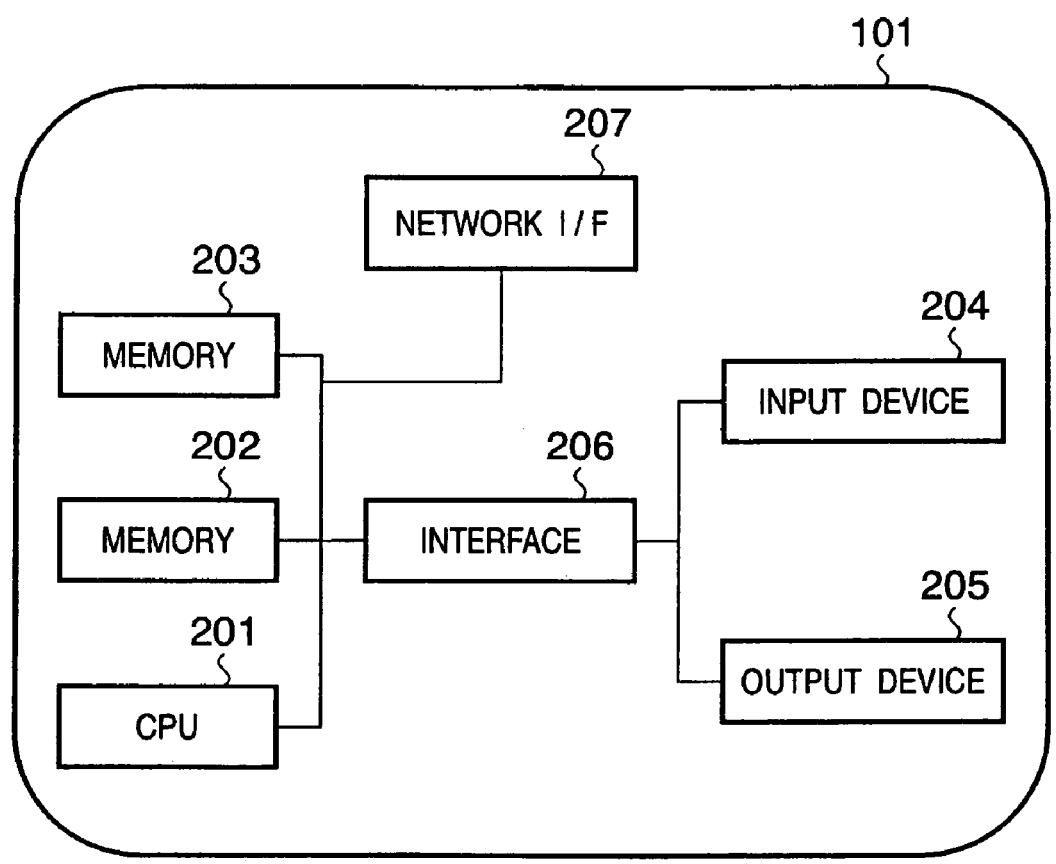
FIG. 2 is a block diagram showing the arrangement of a client PC which can be connected to the image forming system according to the embodiment of the present invention.

FIG. 2 is a block diagram showing an example of the arrangement of the client PC 101. A CPU 201 is a central control unit which controls the overall client PC. A memory 202 is a volatile memory such as a RAM or the like, and serves as a main memory of the CPU 201. The memory 202 temporarily stores control programs loaded from a hard disk or the like, and various arithmetic result data by the CPU 201 and control data. A memory 203 is a nonvolatile memory, and comprises a ROM, hard disk drive (HDD), Floppy® disk drive (FDD), CD-ROM drive, and the like. The ROM stores a program for activating the client PC 101. The hard disk drive stores various programs to be executed by the client PC 101. The Floppy® disk drive stores data saved by the client PC 101. Note that the Floppy® disk drive and CD-ROM drive allow to remove storage media.

An input device 204 is a device for giving input data to the client PC, and comprises a keyboard, mouse, and the like. An output device 205 is a device for outputting the program, data, and the like executed by the client PC, and comprises a display or the like. An interface 206 performs connection control between the client PC and external devices (the input device 204 and output device 205 in this case). A network interface 207 includes a network controller which implements connection between the network 107 and client PC 101.

Figure 3:
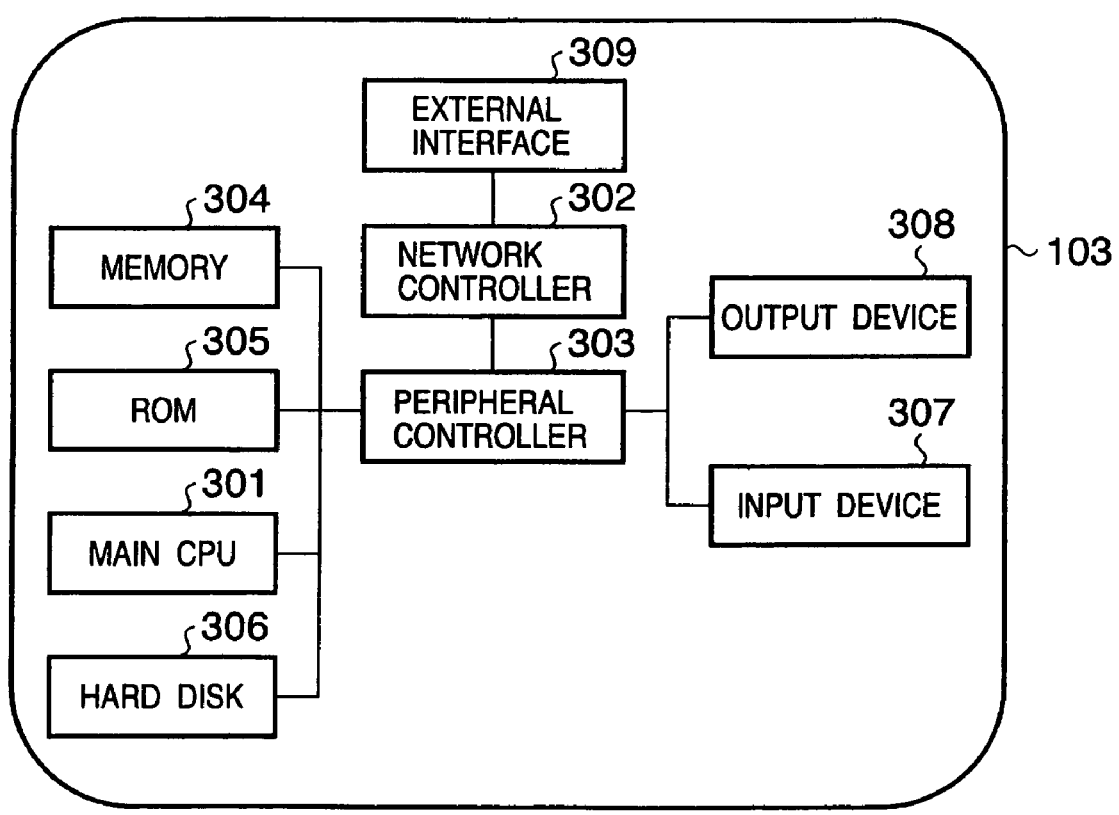
FIG. 3 is a block diagram showing the arrangement of a printer server which can be connected to the image forming system according to the embodiment of the present invention.

FIG. 3 shows the arrangement of the printer server 103 according to this embodiment. A CPU 301 is a central control unit that performs the overall control. A network controller 302 connects the network via an external interface 309, and implements data communications among the client PCs, printers, and other devices on the network. Such data communications include, for example:

(1) reception of a print request and print data from the client PC 101 and transmission of them to the printer 104;

(2) reception of a save request and save data from the client PC 101 and transmission of the save data to another device; and (3) reception of printer status information such as error information due to paper jam or the like, job information, and the like, and transmission of such information to the client PC 101.

A peripheral controller 303 is connected to the CPU 201 via a bus, and serves as an interface among the network controller 302, an input device 307 and output device 308, and the CPU 301.

A memory 304 is a volatile memory which temporarily saves print data and the like. In this embodiment, the printer server 103 holds a print queue in the memory 304, and manages the execution order of print jobs and the like. A ROM 305 is a read-only memory which saves various control programs including control of activation of the printer server 103 itself and the like. A hard disk unit 306 temporarily or permanently saves print data, save data, and the like, and is used to cope with, e.g., a case wherein data that exceeds the capacity of the memory 304 need be held. The hard disk 306 forms a magnetic storage medium, i.e., a nonvolatile memory. The input device 307 is a device for giving input data to the printer server 103, and comprises a keyboard, mouse, and the like. The output device 308 is a device for outputting the program, data, and the like executed by the printer server 103, and comprises a display or the like. The external interface 309 may comprise various communication interfaces such as USB and the like in addition to the aforementioned network.

Figure 4:
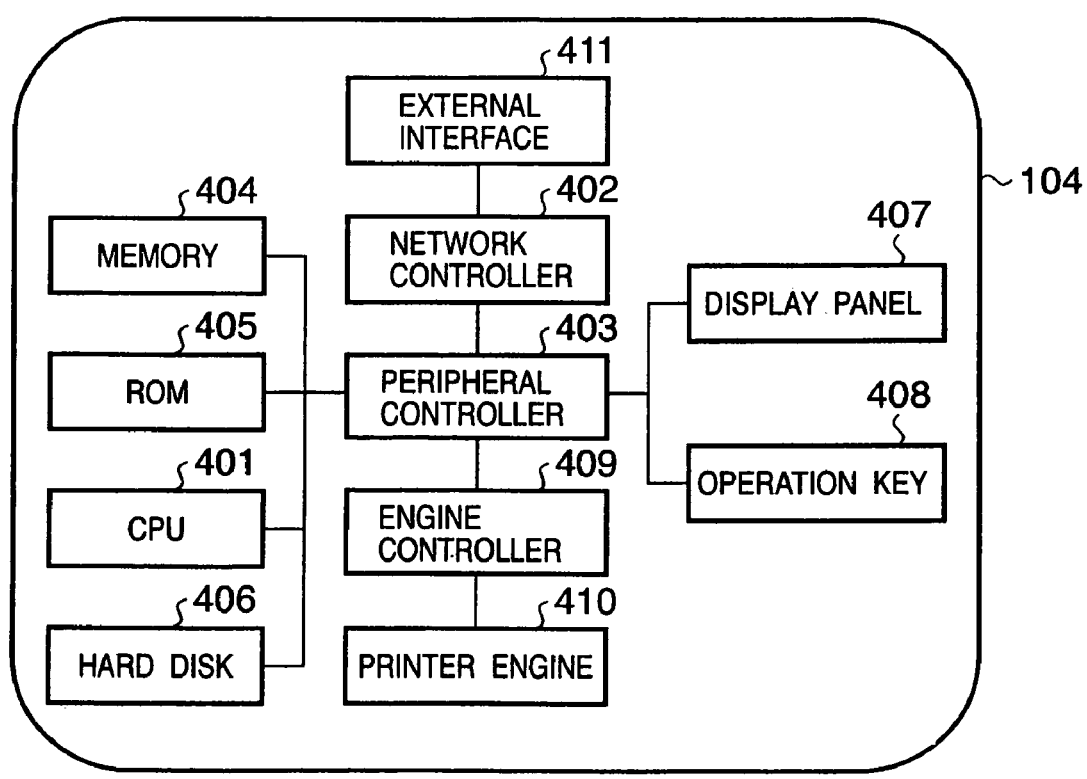
FIG. 4 is a block diagram showing the arrangement of a printer which can be connected to the image forming system according to the embodiment of the present invention.

FIG. 4 is a block diagram showing the arrangement of the printer 104 according to this embodiment. A CPU 401 is a central control unit which controls the overall printer 104. A network controller 402 connects the network via an external interface 411 and implements data communications with the printer server 103. Data communications made in this case include:

(1) reception of a print request, print data, save request, and save data from the printer server 103; and (2) transmission of printer status information such as error information due to paper jam or the like to the printer server 103.

A peripheral controller 403 is connected to the CPU 401, and serves as an interface among the network controller 402, a display panel 407, an operation key 408, an engine controller 409, and the CPU 401.

A memory 404 is a volatile memory which temporarily saves print data and the like. A ROM 405 is a read-only memory, and saves various control programs to be executed by the CPU 401 as well as control of activation of the printer itself and the like. A hard disk unit 406 is used to temporarily or permanently save print data, save data, and the like, to hold data exceeding the capacity of the memory 404, and so forth. The hard disk 406 forms a magnetic storage medium, i.e., a nonvolatile memory. The display panel 407 serves as a monitor that displays the printer status. The input device (operation key) 408 includes various key switches and the like, and allows the user to input instructions such as a control request to the printer 104, a display switching instruction to the display panel 407, and the like.

The engine controller 409 controls driving of a printer engine 410, output data transfer, and the like, and the printer engine 410 is a printer which outputs a final output image. The external interface 411 may comprise communication interfaces such as USB and the like in addition to the aforementioned network.

Figure 5:
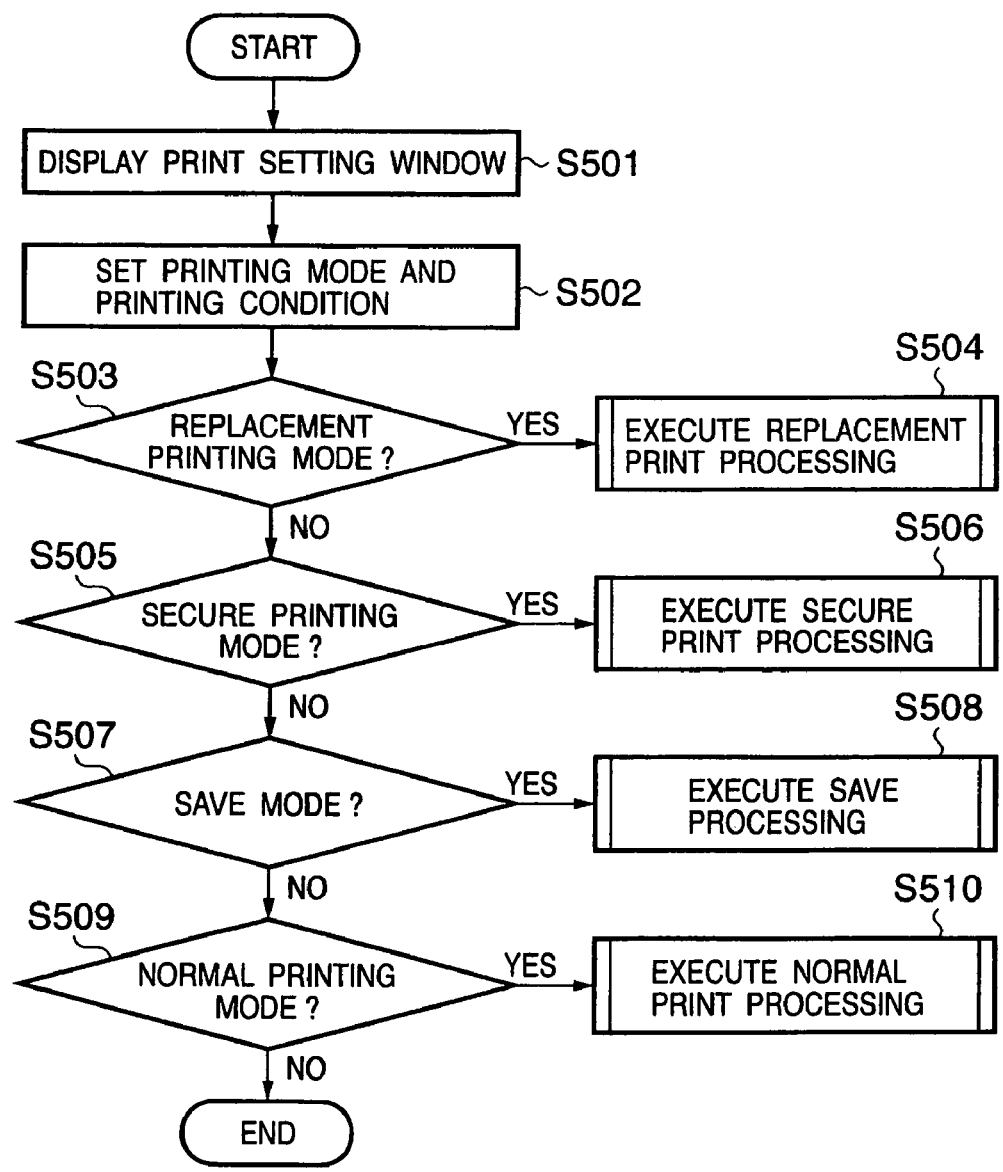
FIG. 5 is a flowchart for explaining a setting sequence of printing conditions and a printing mode in the client PC.
Figure 6:
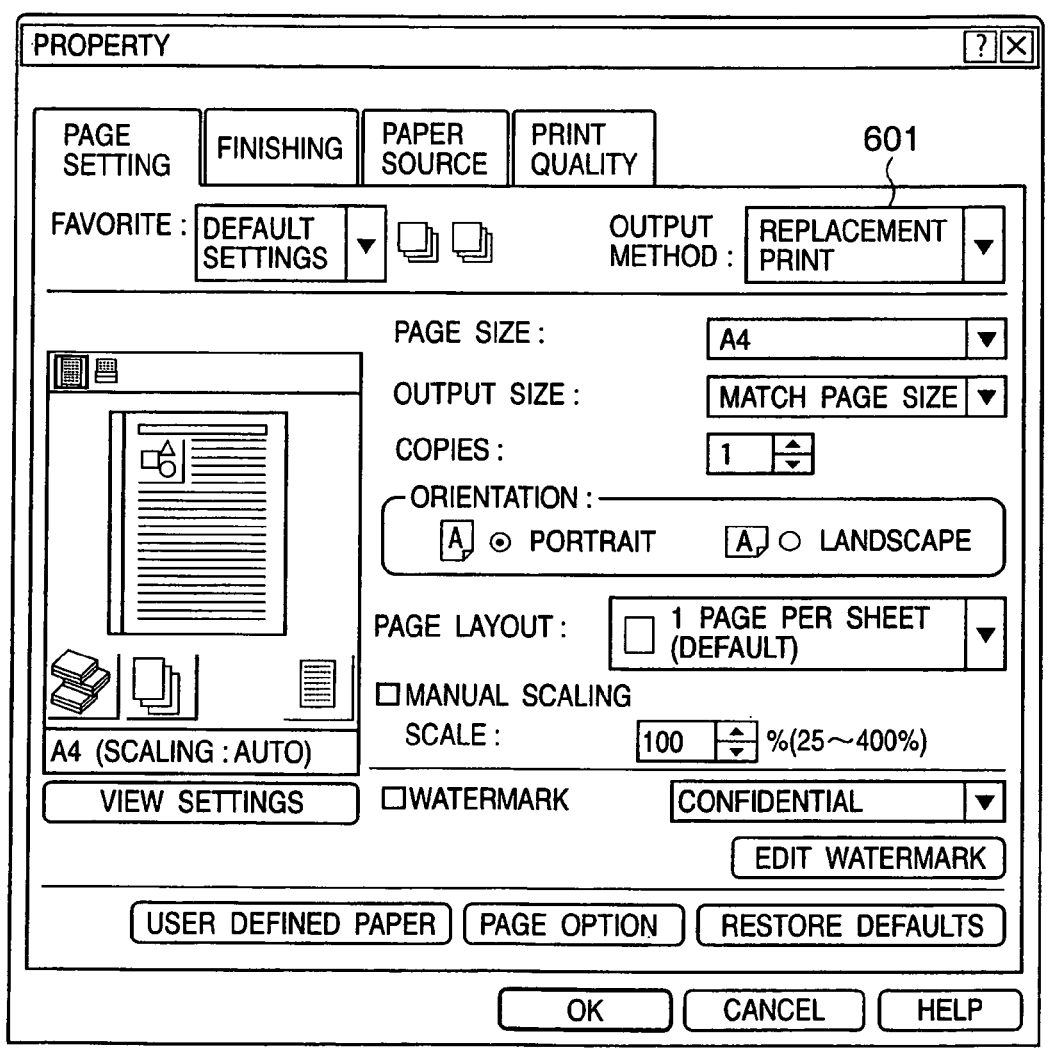
FIG. 6 shows an example of a print setting window in the client PC.

The setting sequence of the printing conditions and printing mode in the client PC 101 will be described below using the flowchart of FIG. 5. The processing shown in FIG. 5 is implemented when the CPU 201 executes a printer driver program which is stored in the memory 203 of the client PC 101 (or which is stored in the memory 203 or hard disk, and is loaded onto the memory 202). In step S501, a print setting window shown in FIG. 6 is displayed on the output device 205 serving as the display. Using the print setting window shown in FIG. 6, the user can set an output method, page settings upon output, post-processing method, paper feed position, print quality, and the like. The output method is selected using an output method menu 601 in FIG. 6. In this embodiment, as the output method that can be set, a replacement printing mode, secure printing mode, save mode, and normal printing mode are prepared. When the user inputs a print execution instruction after completion of various settings, the flow advances to step S503 and subsequent steps, and processing according to the set output mode is executed.

If the replacement printing mode is set, replacement print processing is executed (steps S503 and S504). The replacement print processing will be described in detail later. Likewise, if the secure printing mode is set, print processing using a secure print technique is executed (steps S505 and S506). If the save mode is set, save processing of print data in the hard disk or the like is executed (steps S507 and S508). Furthermore, if the normal printing mode is selected, normal print processing is executed based on the print data (steps S509 and S510).

The basic operations and arrangements of the replacement printing mode, secure printing mode, save mode, and normal printing mode are known to those who are skilled in the art. Management of the execution order of print jobs in the replacement printing mode according to this embodiment will be described in detail below.

Figure 7:
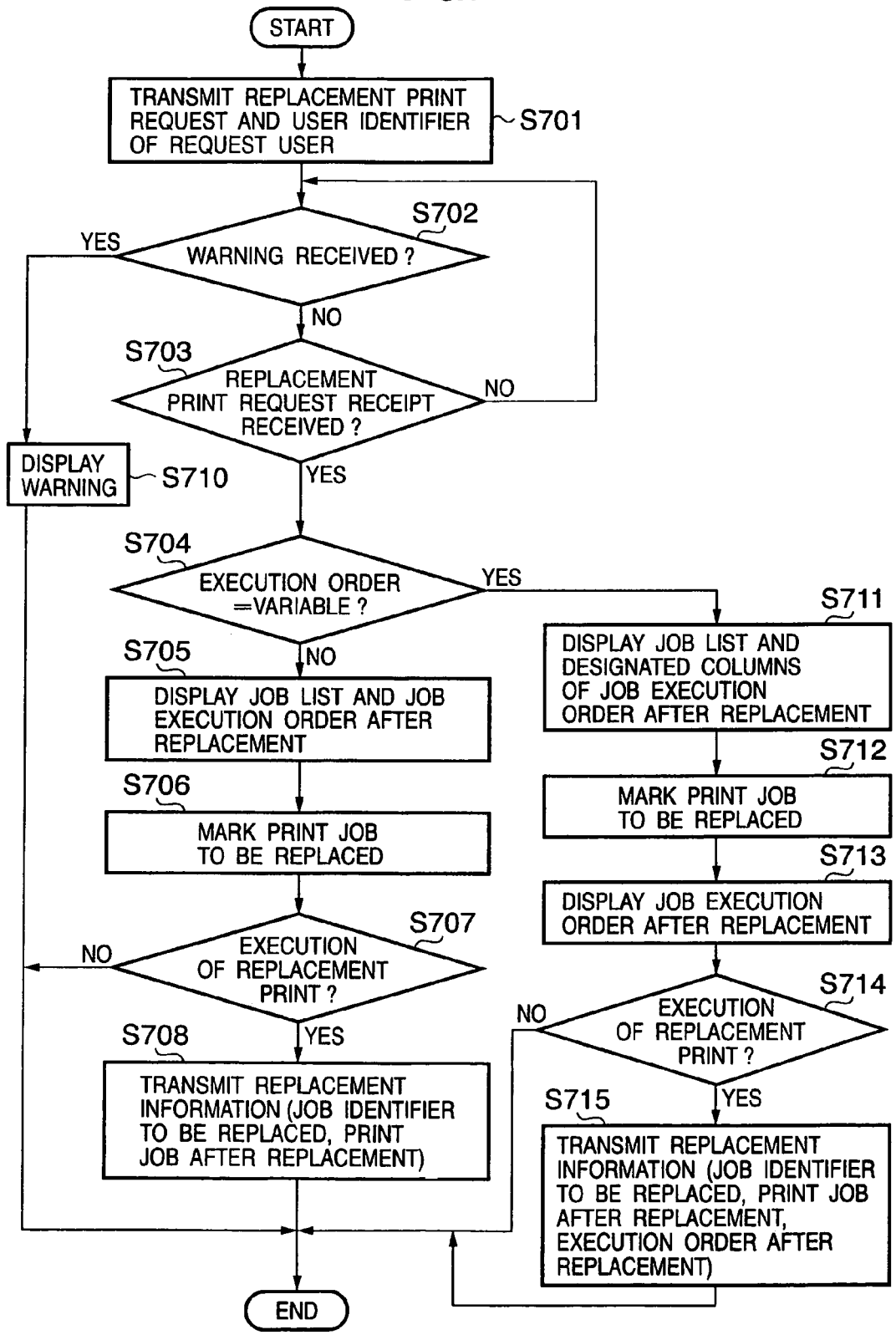
FIG. 7 is a flowchart of replacement print processing in the client PC according to the embodiment of the present invention.

The replacement print processing according to this embodiment will be described below using the flowcharts of FIGS. 7 and 8. FIG. 7 is a flowchart showing the replacement print processing in the client PC 101 of this embodiment, and FIG. 8 is a flowchart showing the replacement print processing in the printer server 103 of this embodiment.

Figure 14:
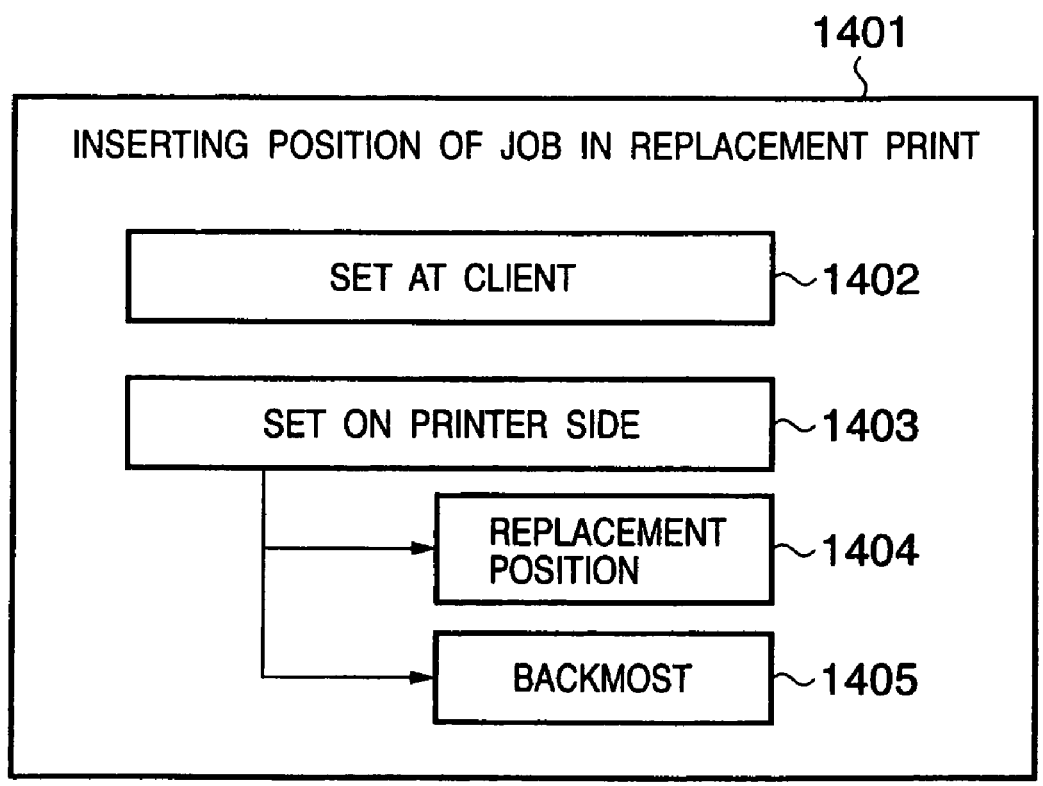
FIG. 14 shows a user interface example used to set an inserting position of a replacement print job in the printer server.

Note that in the printer server 103, whether the inserting position of a print job in the replacement printing mode is set on the client side or the printer side is set in advance. For example, the printer server 103 displays a setting window 1401 shown in FIG. 14 on the output device 308. When the user selects "set at client" (1402) on this setting window 1401 by operating the input device 307, the inserting position of a job into a print queue in the replacement printing mode in the image forming system can be set on the client side. When the user selects "set on printer side" (1403), the inserting position of a print job into a print queue in the replacement printing mode is determined in accordance with the settings on the printer side (the printer server 103 in this example). When the user selects "set on printer side" (1403), the control further prompts the user to select one of "replacement position (position of a print job to be replaced)" (1404) and "backmost" (1405) as the inserting position of the print job into a print queue. After the inserting position of the print job in the replacement printing mode is set using the user interface shown in FIG. 14, the replacement print processing to be described below is executed.

Figure 9A:
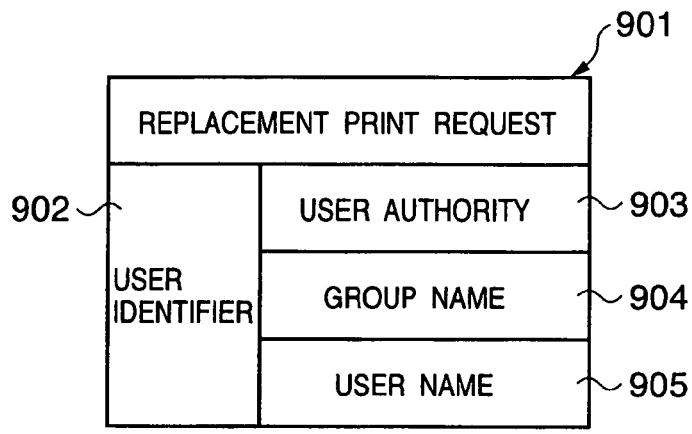
FIG. 9A shows an example of the data configuration of a replacement print request.

The client PC 101 transmits a replacement print request to the printer server 103 in step S701 in FIG. 7, and waits for data received from the printer server 103 in steps S702 and S703. FIG. 9A shows an example of the data configuration of the replacement print request issued in step S701. As shown in FIG. 9A, a replacement print request 901 includes a user identifier 902. Note that the user identifier 902 includes a user authority 903, group name 904, and user name 905, and is used in the printer server 103 to determine whether or not a print job to be replaced is stored in the print queue.

The printer server 103 waits for reception of the replacement print request 901 in step S801. If the replacement print request transmitted in step S701 is received by the printer server 103, the flow advances from step S801 to step S802. In step S802, replaceable print jobs are searched for using the user identifier 902 included in the received replacement print request 901. The print job search sequence in step S802 will be described later using the flowchart of FIG. 13. As a result of this search, if no replaceable print job is found, the flow advances from step S803 to step S810. In step S810, a warning message indicating that no replaceable print job is found is transmitted to the client PC as the issuance source of the replacement print request.

Upon reception of the warning message transmitted in step S810, the flow advances from step S702 to S710, and the client PC 101 displays the received warning message on the output device 205 as the display, thus ending this processing.

Figure 9B:
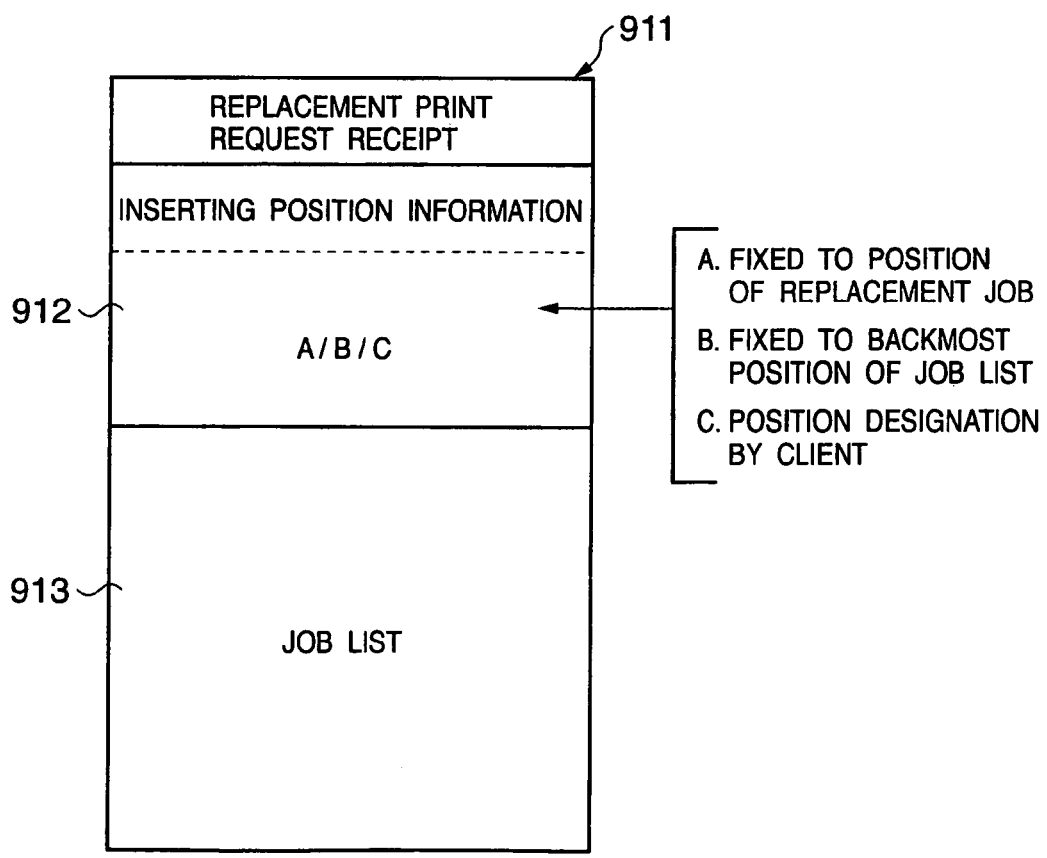
FIG. 9B shows an example of the data configuration of a replacement print request receipt.

On the other hand, if the print job that can be replaced is found in the printer server 103 as a result of search in step S802, the flow advances from step S803 to step S804. In step S804, a replacement print request receipt 911 shown in FIG. 9B is transmitted to the client PC as the issuance source of the replacement print request. FIG. 9B shows an example of the data configuration of the replacement print request receipt 911. The replacement print request receipt 911 includes inserting position information 912 indicating the inserting position of the replacement print job into the print queue, and a job list 913. The job list 913 indicates the current contents of the print queue in the printer server 103. The inserting position information 912 indicates the inserting position of the replacement print job into the print job list, i.e., the inserting position set using the interface described above using FIG. 14.

When "set on printer side" (1403) and "inserting position" (1404) are selected, the inserting position information 912 holds "A. fixed to position of replacement job". In this case, after the print job to be replaced is deleted from the print queue, the replacement print job is inserted to that position in the print queue. When "set on printer side" (1403) and "backmost" (1405) are selected, the inserting position information 912 holds "B. fixed to backmost position of job list". In this case, after the print job to be replaced is deleted from the print queue, the replacement print job is added to the backmost position of the print queue. When "set at client" (1402) is selected, the inserting position information 912 holds "C. position designation by client". In this case, the inserting position of the replacement print job into the print queue can be designated at the client PC which issued the replacement print request. In this embodiment, one of "position of replacement job", "job list backmost position", and "arbitrary order" can be designated as the inserting position into the print queue at the client PC 101.

If the client PC 101 receives the replacement print request receipt 911, the flow advances from step S703 to step S704. In step S704, the inserting position information 912 is checked to determine if the inserting position of the replacement print job into the print queue is "fixed" to the designated position on the printer side (A or B above) or "variable" (C) on the client side. If the inserting position is "fixed", the flow advances to step S705; if it is "variable", the flow advances to step S711.

The processing performed when the inserting position is "fixed" will be described below. In step S705, a job list 1002 is displayed on the output device 205, as shown in a window 1001 of FIG. 10, in accordance with the received job list. 913. At this time, the execution order (inserting position) of the print job after replacement is displayed in accordance with the inserting position information 912. In the example of FIG. 10, the inserting position information 912 is set with "B. fixed to backmost position of job list" and, hence, a message "data will be inserted at backmost position after replacement" is displayed, as indicated by reference numeral 1003. If the inserting position information 912 designates "A. fixed to position of replacement job", for example, a message "data will be inserted at position of print job to be replaced after replacement" is displayed at the position 1003.

In the job list 1002, "o" is displayed in columns 1002a of replaceable print jobs. As another method of clearly specifying replaceable print jobs, a method of graying out print jobs which cannot be described and the like may be used. That is, in step S705 print jobs which can be designated as replacement objects are extracted with reference to the job names and group names of print jobs included in the job list 913, and the authority of the user of the client PC 101 and the group name and user name of that user. "o" marks are added to the columns 1002a of the extracted print jobs, which are displayed in distinction from other print jobs. In the example of FIG. 10, print jobs of the same group (group2) as that of the user who issued the replacement print request can be designated as replacement objects.

The user can select a desired print job as a print job to be replaced from the job list 1002 shown in FIG. 10. In step S706, the selected print job to be replaced is marked in accordance with this selection of a print job, and is clearly specified as a selected state. FIG. 10 shows a state wherein print job No. 7 is selected and marked. If the user presses an OK button 1011 in this state, the flow advances from step S707 to step S708, and replacement information is transmitted to the printer server 103.

If the user presses a cancel button 1012 on the window 1001 in FIG. 10, this processing ends after step S707 since it is determined that the replacement print processing is canceled. Since only 10 print jobs are displayed in the example of FIG. 10, if there are 11 or more print jobs, the user can press a "next" button 1013 to display the remaining jobs of the job list.

Figure 11A:
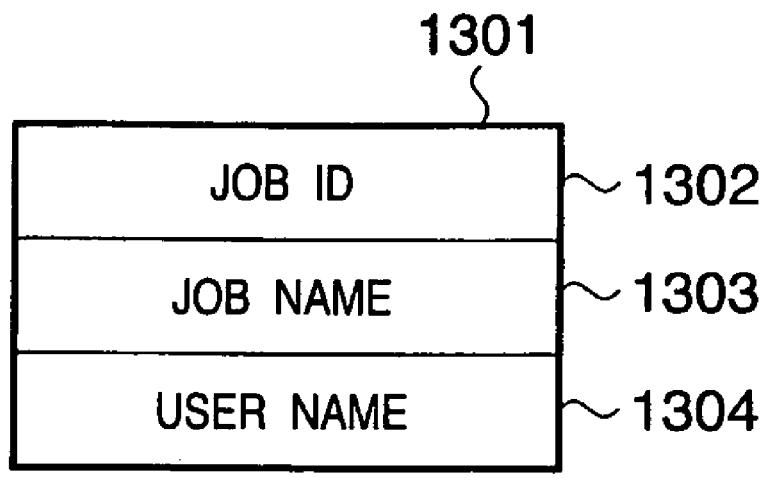
FIG. 11A shows an example of the data configuration of an identifier of a replacement object job.
Figure 11B:
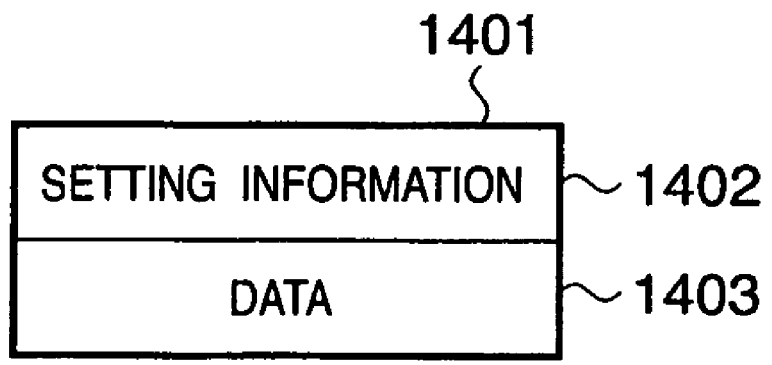
FIG. 11B shows an example of the data configuration of a print job.

The replacement information includes a replacement job identifier 1301 shown in FIG. 11A and a print job 1401 after replacement shown in FIG. 11B. The replacement job identifier 1301 includes a job ID 1302, job name 1303, and user name 1304 of the job to be replaced, which is marked in step S706. In the example of FIG. 10, the job ID=7, job name=Job FFF, and user name=miya. The print job 1401 includes setting information 1402 and print job data 1403. The print job data 1403 includes information such as a user name, group name, the number of pages, the number of copies, and the like in addition to the print data. The setting information 1402 includes information indicating the inserting position of the print job after replacement. In step S708, the position (A or B) designated by the inserting position information 912 of the replacement print request receipt 911 is set. When the inserting position of the replacement print job into the print queue is "set on printer side", no information indicating the inserting position may be sent from the client PC 101 to the printer server 103.

If the printer server 103 receives the replacement information output from the client PC 101 in step S708, the flow advances from step S805 to step S806. In step S806, the processing branches depending on the state set in FIG. 14. If the inserting position of the replacement print job into the print queue is set according to the setting on the printer side, the flow advances to step S807, and the replacement print job is inserted and registered at the position of the print queue designated via the interface of FIG. 14. That is, if "replacement position" 1404 is set, the replacement job is inserted and registered at the position of the job to be replaced; if "backmost" 1405 is set, it is inserted and registered at the backmost position. In step S809, the print job specified by the replacement job identifier 1301 is deleted. In this way, the update processing of the print queue according to the replacement print request is completed.

The operation executed when the inserting position of the replacement print job into the print queue is fixed on the printer side has been explained. A case will be explained next wherein the inserting position of the replacement print job is variable on the client side. In this case, the inserting position information 912 of the replacement print request receipt 911 is set with "C. position designation by client". Therefore, when the client PC 101 receives this replacement print request receipt 911, the flow advances from step S704 to step S711.

In step S711, a window 1201 including the job list 1002, as shown in FIG. 12, is displayed in accordance with the job list 913. The contents of the window 1201 are substantially the same as that described using FIG. 10, except that the window 1201 provides a user interface 1203 used to designate the inserting position of the print job after replacement. This user interface 1203 adopts a pull-down menu format. The user can set one of "position of print job to be replaced (to be referred to as "original position" hereinafter)", "backmost position of job list (to be referred to as "backmost" hereinafter)", and "desired order (designated by number)" from a menu 1204 of the user interface 1203. If the user designates "original position" or "backmost", the same result is obtained as that when "replacement position" (1404) or "backmost" (1405) is selected. After that, when the user selects a print job to be replaced, the selected print job to be replaced is clearly specified according to the selection of a print job in step S712, as shown in FIG. 12. In step S713, the inserting position of the print job after replacement is displayed on the user interface 1203.

Note that the pull-down menu 1204 of the user interface 1203 displays only positions which can be designated. For example, if there are only 10 print jobs, numerals after "11" are not displayed. Also, since the print processing of a print job at inserting position "1" is underway, that position is not displayed in the menu 1204. Also, the inserting position may be limited to an order after the print job to be replaced.

After that, if the user presses the OK button 1011, the flow advances from step S714 to S715, and replacement information is transmitted to the printer server. In this replacement information, the setting information 1402 includes the setting position, which indicates one of "original position", "backmost", and "number indicating order in print queue" as the inserting position of the print job after replacement.

When the printer server 103 receives the replacement information, the flow advances from step S806 to step S808. In step S808, the replacement print job is inserted and registered at the position of the print queue, which is indicated by the inserting position included in the setting information 1401. In step S809, the print job specified by the replacement job identifier 1301 is deleted. In this way, the update processing of the print queue according to the replacement print request is completed.

As described above, when the replacement print request is issued from the client PC, the user can explicitly designate a desired position of the print job after replacement. Even when the print job after replacement is fixed on the printer side, the user can easily recognize the inserting position of the print job via the interface shown in FIG. 10.

Figure 13:
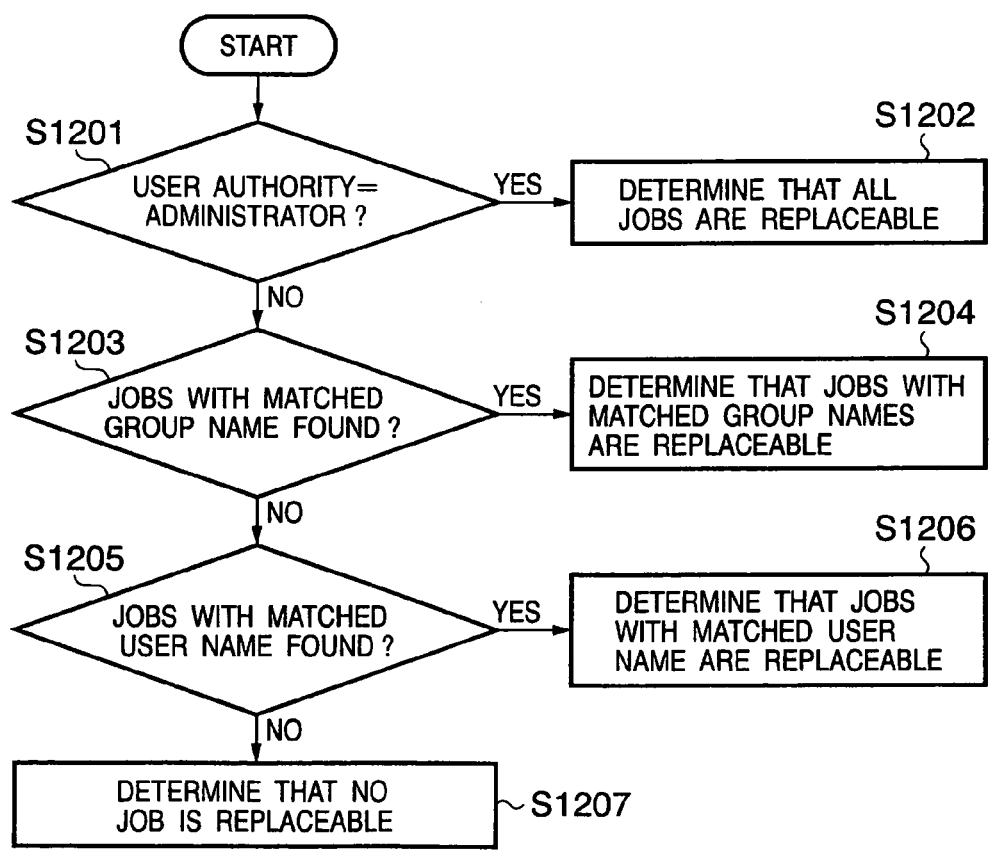
FIG. 13 is a flowchart showing a replaceable print job search sequence in the printer server.

The replaceable job search sequence in step S802 of the printer server 103 will be described below using the flowchart of FIG. 13. If it is determined in step S1201 that the user authority 902 in the user identifier 902 included in the replacement print request 901 is administrator authority, it is determined that all jobs are replaceable (step S1202). If it is determined in step S1201 that the user authority is not administrator authority, jobs whose group names match the group name 904 are searched for (step S1203), and the matched jobs are determined to be replaceable (step S1204). If no job whose group name matches the group name 904 is found in step S1203, jobs whose user names match the user name 905 are searched for (step S1205), and matched jobs are determined to be replaceable (step S1206). If no job whose user name matches the user name 905 is found in step S1205, it is determined that there is no replaceable job (step S1207).

With the above arrangement, print information and print data of a print job whose request has been issued due to a setting error, operation error, or the like, can be changed even after that print job has been enqueued. For this reason, the need for issuing a cancel request of such print job, and issuing an output request of a print job whose print information or print data is partially modified can be obviated. Also, since the job execution order after change can be selected, the operability associated with print jobs can be improved.

In the above embodiment, the printer server 103 notifies the client PC 101 of registration status of all print jobs in the print queue (step S804). However, the present invention is not limited to this. For example, the printer server 103 may notify the client PC 101 of only print jobs that the client PC 101 can designate as replacement objects. In this case, the inserting position that can be designated on the client side is one of "replacement position" and "backmost". This is because it is not practical to designate the inserting position by the number since the user cannot recognize the print queue as a whole.

In steps S705 and S711 (i.e., in the client PC), "o" marks are added to the columns 1002a by extracting print jobs which can be designated as replacement objects. However, the printer server 103 may generate information indicating print jobs that can be designated as replacement objects, and may include it in the job list 913.

The above embodiment adopts the arrangement in which the client PCs, printer server, and printers are provided as independent apparatuses, and are connected to the network. However, the present invention is not limited to such specific arrangement. That is, in any of apparatuses that exist in the system, a client unit (a unit that executes the aforementioned functions of the client PC 101) that issues a print job, a management unit (a unit that executes the aforementioned functions of the printer server 103) that manages print jobs using a print queue, and a printer unit (a unit that executes the aforementioned functions of the printer 104) that executes print processing according to print jobs need only be implemented. For example, an arrangement in which the management unit and printer unit are implemented by a single apparatus may be adopted, an arrangement in which the client unit and management unit are implemented by a single apparatus, or an arrangement in which the client unit, management unit, and printer unit are implemented by a single apparatus may be adopted.

In the arrangement described above, in a system which has a printer, an external apparatus such as a host computer or the like, and the like, various user's instructions are accepted via a user interface unit of the external apparatus, and the printer is controlled to execute operations based on the instructions. However, the present invention is not limited to this, and the following arrangement may be adopted.

For example, an operation unit which has a display unit such as a liquid crystal touch panel or the like of a printing apparatus itself is used as an example of the user interface unit of this embodiment. As the printing apparatus, a copying machine, facsimile apparatus, digital multi-functional peripheral equipment, and the like, which can accept a job from a data generation source, and can print that data by a printer unit via a storage unit such as a hard disk or the like may be used. The data generation source includes job data from a scanner unit, job data from an external apparatus such as a computer or the like, and so forth. A control unit of the printing apparatus controls to accept various user's instructions via the operation unit of the printing apparatus. The control unit of the printing apparatus controls the printing apparatus to execute operations based on the instructions.

In this way, as in the above embodiment, in a system which has a printing apparatus that can print data in a storage unit which can store a plurality of job data to be printed, (1) replacement processing of any of the plurality of job data already stored in the storage unit can be executed, and (2) the user can designate the execution order of a job to be replaced via the user interface unit (operation unit) of the printing apparatus.

With the above arrangement, not only the printer function but also the copy function can be coped with, and the effects of the embodiment can be further improved.

Note that the present invention includes a case wherein the invention is achieved by directly or remotely supplying a program of software that implements the functions of the aforementioned embodiments (a program corresponding to the flowcharts shown in the respective drawings in the embodiments) to a system or apparatus, and reading out and executing the supplied program code by a computer of that system or apparatus.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as along as they have the program function.

As a recording medium for supplying the program, for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

According to the present invention, the execution order of a new print job input in replacement print processing can be designated, and the operability associated with print jobs can be improved.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2005-104361, filed on Mar. 31, 2005, which is hereby incorporated by reference herein in its entirety.

What is claimed is:

1. A job management method for requesting to replace a print job registered in a print queue by a new print job, comprising:

an acquisition step of acquiring contents of the print queue from a management unit that manages the print queue;

a first designation step of prompting a user to designate a print job to be replaced by displaying the contents of the print queue acquired in the acquisition step;

a second designation step of prompting the user to designate an inserting position of the new print job into the print queue; and an output step of outputting, to the management unit, information indicating the print job to be replaced designated in the first designation step, information indicating the inserting position designated in the second designation step, and the new print job, wherein the first designation step includes a step of displaying a list of print jobs based on the contents of the print queue, and displaying print jobs which can be designated as the print job to be replaced in distinction from other print jobs.

2. The method according to claim 1, wherein the second designation step includes a step of allowing the user to designate, as the inserting position, a position of the print job to be replaced, and a backmost position of the print queue.

3. The method according to claim 1, wherein the second designation step includes a step of allowing the user to designate the inserting position within a range of the print queue.

4. A job management method for requesting to replace a print job registered in a print queue by a new print job, comprising:

an acquisition step of acquiring contents of the print queue from a management unit that manages the print queue;

a first designation step of prompting a user to designate a print job to be replaced by displaying the contents of the print queue acquired in the acquisition step;

a second designation step of prompting the user to designate an inserting position of the new print job into the print queue;

an output step of outputting, to the management unit, information indicating the print job to be replaced designated in the first designation step, information indicating the inserting position designated in the second designation step, and the new print job; and a step of inhibiting, when the inserting position of the new print job into the print queue follows a position set by the management unit, processing in the second designation steps and of presenting the position set by the management unit.

5. The method according to claim 4, wherein the second designation step includes a step of allowing the user to designate, as the inserting position, a position of the print job to be replaced, and a backmost position of the print queue.

6. The method according to claim 4, wherein the second designation step includes a step of allowing the user to designate the inserting position within a range of the print queue.

7. A job management method for managing execution of print jobs using a print queue, comprising:
   a setting step of controlling to set one of a first mode for externally designating an inserting position of a new print job into a print queue and a second mode that follows designation of itself in replacement print processing;
   a notification step of notifying contents of the print queue and a setting state in the setting step in response to a replacement print request;
   a replacement step of deleting a print job to be replaced acquired in response to the notification in the notification step from the print queue, and inserting an acquired new print job into the print queue; and
   a determination step of determining based on information of an issuer included in the replacement print request whether or not print jobs which can be designated as replacement objects exist in the print queue,
   wherein the replacement step includes a step of inserting the new print job at a position indicated by inserting position designation information acquired together with the new print job when the first mode is set, and inserting the new print job at a position which is set in advance when the second mode is set, and
   wherein the notification step includes a step of notifying, when it is determined in the determination step that a print job which can be designated as a replacement object does not exist, a message that advices accordingly.

8. The method according to claim 7, wherein the setting step includes a step of allowing to set one of a position of a print job designated as the replacement object and a backmost position of the print queue as the inserting position of the new print job into the print queue.

9. A job management method for managing execution of print jobs using a print queue, comprising:
   a setting step of controlling to set one of a first mode for externally designating an inserting position of a new print job into a print queue and a second mode that follows designation of itself in replacement print processing;
   a notification step of notifying contents of the print queue and a setting state in the setting step in response to a replacement print request;
   a replacement step of deleting a print job to be replaced acquired in response to the notification in the notification step from the print queue, and inserting an acquired new print job into the print queue; and
   an extraction step of extracting print jobs which can be designated as replacement objects from the print queue based on information of an issuer included in the replacement print request,
   wherein the replacement step includes a step of inserting the new print job at a position indicated by inserting position designation information acquired together with the new print job when the first mode is set, and inserting the new print job at a position which is set in advance when the second mode is set, and
   wherein the notification step includes a step of notifying the print jobs extracted in the extraction step as the contents of the print queue.

10. The method according to claim 9, wherein the setting step includes a step of allowing to set one of a position of a print job designated as the replacement object and a backmost position of the print queue as the inserting position of the new print job into the print queue.

11. An information processing apparatus for requesting to replace a print job registered in a print queue by a new print job, comprising:
    an acquisition unit configured to acquire contents of the print queue from a management unit that manages the print queue;
    a first designation unit configured to prompt a user to designate a print job to be replaced by displaying the contents of the print queue acquired by said acquisition unit;
    a second designation unit configured to prompt the user to designate an inserting position of the new print job into the print queue; and
    an output unit configured to output, to the management unit, information indicating the print job to be replaced designated by said first designation unit, information indicating the inserting position designated by said second designation unit, and the new print job,
    wherein the first designation unit displays a list of print jobs based on the contents of the print queue, and displays print jobs which can be designated as the print job to be replaced in distinction from other print jobs.

12. A job management apparatus for managing execution of print jobs using a print queue, comprising:
    a setting unit configured to control to set one of a first mode for externally designating an inserting position of a new print job into a print queue and a second mode that follows designation of itself in replacement print processing;
    a notification unit configured to notify contents of the print queue and a setting state in the setting unit in response to a replacement print request;
    a replacement unit configured to delete a print job to be replaced acquired in response to the notification by said notification unit from the print queue, and insert an acquired new print job into the print queue; and
    a determination unit configured to determine based on information of an issuer included in the replacement print request whether or not print jobs which can be designated as replacement objects exist in the print queue,
    wherein the replacement unit inserts the new print job at a position indicated by inserting position designation information acquired together with the new print job when the first mode is set, and inserts the new print job at a position which is set in advance when the second mode is set, and
    wherein the notification unit notifies, when it is determined by the determination unit that a print job which can be designated as a replacement object does not exist, a message that advices accordingly.

13. A computer readable medium storing a program for making a computer execute a job management method of claim 1.

14. A computer readable medium storing a program for making a computer execute a job management method of claim 4.

15. A computer readable medium storing a program for making a computer execute a job management method of claim 7.

16. A computer readable medium storing a program for making a computer execute a job management method of claim 9.

17. A program stored on a computer-readable medium for making a computer execute a job management method of claim 1.

18. A program stored on a computer-readable medium for making a computer execute a job management method of claim 4.

19. A program stored on a computer-readable medium for making a computer execute a job management method of claim 7.

20. A program stored on a computer-readable medium for making a computer execute a job management method of claim 9.

21. An information processing apparatus for requesting to replace a print job registered in a print queue by a new print job, comprising:
   an acquisition unit configured to acquire contents of the print queue from a management unit that manages the print queue;
   a first designation unit configured to prompt a user to designate a print job to be replaced by displaying the contents of the print queue acquired by said acquisition unit;
   a second designation unit configured to prompt the user to designate an inserting position of the new print job into the print queue;
   an output unit configured to output, to the management unit, information indicating the print job to be replaced designated by said first designation unit, information indicating the inserting position designated by said second designation unit, and the new print job; and
   a unit configured to inhibit, when the inserting position of the new print job into the print queue follows a position set by the management unit, processing in the second designation unit, and to present the position set by the management unit.

22. A job management apparatus for managing execution of print jobs using a print queue, comprising:
   a setting unit configured to control to set one of a first mode for externally designating an inserting position of a new print job into a print queue and a second mode that follows designation of itself in replacement print processing;
   a notification unit configured to notify contents of the print queue and a setting state in the setting unit in response to a replacement print request;
   a replacement unit configured to delete a print job to be replaced acquired in response to the notification by said notification unit from the print queue, and insert an acquired new print job into the print queue; and
   an extraction unit configured to extract print jobs which can be designated as replacement objects from the print queue based on information of an issuer included in the replacement print request,
   wherein the replacement unit inserts the new print job at a position indicated by inserting position designation information acquired together with the new print job when the first mode is set, and inserts the new print job at a position which is set in advance when the second mode is set, and
   wherein the notification unit notifies the print jobs extracted by the extraction unit as the contents of the print queue.

* * * * *